Jan. 25, 1966    N. FRANTZIS    3,230,763

SEMICONDUCTOR PRESSURE DIAPHRAGM

Filed Dec. 27, 1962

INVENTOR.
NICHOLAS FRANTZIS

BY Roger W. Jensen
ATTORNEY

United States Patent Office 3,230,763
Patented Jan. 25, 1966

3,230,763
SEMICONDUCTOR PRESSURE DIAPHRAGM
Nicholas Frantzis, Hyde Park, Mass., assignor to
Honeywell Inc., a corporation of Delaware
Filed Dec. 27, 1962, Ser. No. 247,754
3 Claims. (Cl. 73—141)

This invention is related generally to force sensing apparatus and has specific although not exclusive applicability to pressure measuring apparatus.

The prior art has shown various methods of measuring force through the use of piezo resistive strain elements which are bonded or otherwise attached to a flexible diaphragm and connected in the form of a bridge circuit. One example of this was discussed at the Instrument Society of America Conference held in Los Angeles, California, September 11–15, 1961, wherein papers were given describing the above mentioned prior art. The papers were published by said society in a compilation entitled "Strain Gage Instrumentation." It must be noted, however, that these strain resistance, or strain sensitive elements, are temperature sensitive. It should further be noted that it is extremely difficult to manufacture several of these elements all with exactly the same resistance in an unstrained condition. It is therefore necessary to provide some type of bridge null inducing circuit or balancing means to compensate for the variations in resistance value in the strain gage elements in a neutral or unstrained condition. Up to the time of the present invention, the strain gage elements and the balancing circuit were located remote from one another and hence in different environments, and any temperature variations applied to the strain gage elements were not necessarily applied to the balancing circuit. In many cases the balancing circuit comprised a voltage dividing network across the input terminals of the bridge circuit with the wiper connected to one of the output terminals of the bridge circuit. Even if these prior units were designed such that the strain gage elements could be mounted in close proximity to the voltage dividing network, the temperature coefficients of the two different elements were so different that temperature compensation over more than a very limited range of temperature was found to be extremely difficult if not impossible.

By practicing the present invention, it is possible to overcome all these difficulties, since the voltage dividing network is composed of the same material, namely a semiconductor, as the strain gage elements, and is mounted on the force or pressure responsive diaphragm in close proximity to the strain gage elements. In this manner both the strain gage elements and the voltage dividing network change with temperature simultaneously and in substantially the same manner since they are both made of the same material. Hence there is no temperature compensation required for most applications or uses other than that inherent in the two portions of the circuit, and such compensation does not change substantially with temperature.

It is therefore an object of this invention to provide an improved force responsive means which is operable to a high degree of accuracy over a wide temperature range with still the same reliabilities and stability of the sensor itself. Further objects and advantages will be apparent from a study of the specification in conjunction with the appended claims and the drawings in which:

Figure 1:
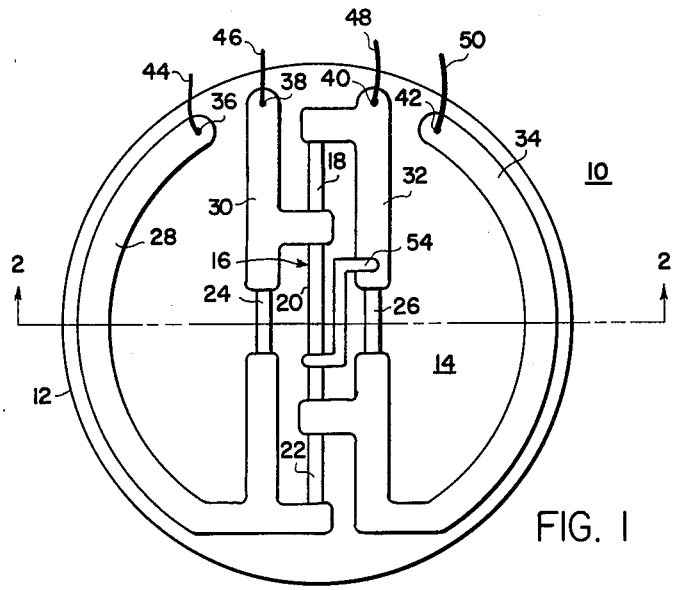
FIGURE 1 is a mechanical representation of the bridge circuit and the voltage dividing network.
Figure 2:
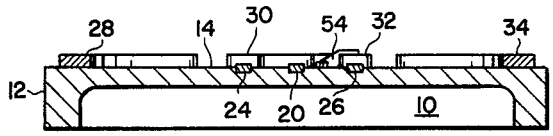
FIGURE 2 is a cross section through line 2—2 of FIGURE 1.

In FIGURE 1 a sensor generally designated as 10 is shown. The sensor 10 comprises in part a circular or disc-shaped force responsive member having an annular outer mounting ring portion 12 and a central diaphragm or force responsive portion 14. This can be constructed by taking a slice of silicon or other suitable material and machining or otherwise removing some of the central material so as to form a cup-like object as shown in FIGURE 2. The machining leaves the outer portion 12 as a mounting ring for coaction with additional supporting means not shown, and a thin flexible layer of silicon on top of the ring to form the central diaphragm portion 14. Suitable impurities are added by suitable techniques such as diffusion to a surface of the diaphragm 14 to form an N or P type piezo resistive strain sensitive path along a diameter of the diaphragm 14 to form a resistive element or impedance means generally designated as 16, which is later used as three distinct elements, impedance means, or segments 18, 20, and 22. If it is so desired, the three segments can be produced individually initially instead of being produced as one continuous resistive segment from one side of the diaphragm to the opposite side. As the resistive portion 16 is produced by diffusing the N or P type impurities into the silicon crystal, a PN junction is formed between the element 16 and the diaphragm 14. Two more piezo resistive strain sensitive elements or impedance means 24 and 26, are diffused into the surface of the diaphragm 14, on opposite sides of and symmetrical with respect to the element 16. The resistive elements 24 and 26 usually in practice would be diffused into the diaphragm portion 14 at the same time as portion 16 and are positioned relatively near the center of diaphragm portion 14. A plurality of conductive elements 28, 30, 32, and 34 are then deposited or otherwise placed on the surfaces of the diaphragm 14 to connect together into a bridge circuit the various resistive elements and portions thereof aforementioned. The conductors may be formed by depositing a metallic conductive film over the entire surface of the sensor 10 which includes the sensitive elements and then, by using masking techniques well known to those skilled in the art, the unwanted portions can be etched away to leave the conductors in the form desired. The conductor 28 is used to connect together one end of resistive element 24 to one end of resistive element 22. Conductive element 30 is used to connect the other end of resistive element 24 to an intermediate point on the resistive element 16 and thereby divide this entire resistive element into the element 18 and a cumulative portion including elements 20 and 22. The conductive element 32 is connected to the other end of resistive element 18, which was originally the end of the entire element 16, and also connects to one end of the resistive element 26. The conductive element 34 is connected to the other end of resistive element 26 and also connects to another intermediate point in the resistive element 16 to divide said cumulative portion into the elements 20 and 22. Junction or connection points 36, 38, 40, and 42 are used in attaching lead wires. As shown, leads 44, 46, 48, and 50 are attached to the conductors 28, 30, 32, and 34, respectively in their respective connection points mentioned above. The resistive elements 18, 22, 24, and 26 together with the associated conductors mentioned above, form a type of Wheatstone bridge or bridge circuit means generally designated as 52 in FIGURE 3.

Since it is extremely difficult to diffuse the same amount of impurities and at the same time make all piezo resistive elements of the same size so that the resistance of all elements be the same or achieve a perfectly balanced bridge circuit, some means of further balancing of the bridge is required. This is accomplished by the remaining or center portion 20 of the resistive element 16. The previously mentioned bridge circuit 52 is energized and a conductor is attached from the conductive element 32 to some point on the resistive element 20. The element 20 is thus used as a voltage dividing means, compensating means, or balancing means 56. When the point is found which produces a minimum output between conductors 28 and 32, a conductor or tap 54 is deposited or otherwise attached between the conductor 32 and that point on resistive element 20. In some instances it may be desired to run the conductive element 54 from conductor 32 along the side of the resistive element 20 and merely run a small piece of molten aluminum or solder over to the resistive element 20 at the appropriate point to make this connection.

In order to position the small piece of molten aluminum or solder in exactly the right place on resistive element 20, additional etching may be desirable to obtain high accuracy in the bridge balancing. One method of placing this tap 54 in exactly the right position, as referred to in the above sentence, is by an etching process. Appropriate masking techniques are used to etch away one side or the other of the tap 54 where it is placed on resistive element 20. This procedure will provide the final balancing needed to give a minimum output under normal or unflexed conditions of the diaphragm 14.

While specific use of the terms silicon, aluminum, and P and N type impurities has been used, it is to be realized that the invention is not limited to these specifics, or their manner of application as described. It will be noted that the resistance elements 24 and 26 will be stressed approximately the same amount and that since the elements 18 and 22 are in approximately the same position on opposite sides of the diaphragm 14, that these will be stressed in approximately the same amount. When the diaphragm 14 flexes in a given direction, the elements 24 and 26 will be strained in the tension mode or direction while due to the bending of the edges of the diaphragm 14, the elements 18 and 22 will be stressed in the compression mode or direction. While the voltage dividing element 20 is also strain sensitive it will still provide the same division of the input signal since it is either strained entirely in compression or entirely in tension.

Figure 3:
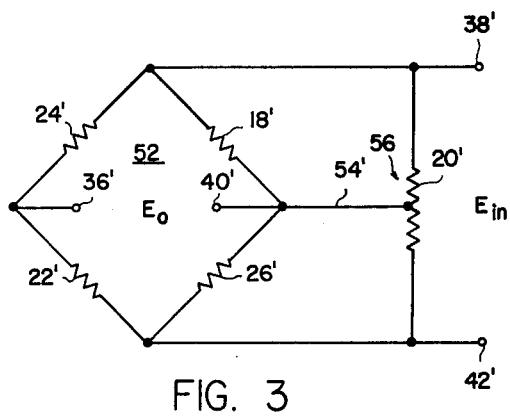
FIGURE 3 is an electrical circuit diagram of the components shown in the center of FIGURE 1.

FIGURE 3 is a schematic diagram of the electrical portions of the sensor 10. The identical components are shown with the same number as used in FIGURES 1 and 2 with a prime (') added. For example, resistive element 24 of FIGURE 1 is shown as 24' in FIGURE 3. As will be understood by those skilled in the art, the voltage dividing network utilizing resistive element 20' and the tap 54' may be used to minimize any unbalance conditions in the bridge circuit 52. If the temperature coefficient of the resistive element 20' is identical with the temperature coefficient of the four resistors in the bridge 52, the output of the bridge circuit under the originally balanced conditions will be the same over any variation in temperature from extremely cold to extremely hot.

The electrical circuitry of sensor 10 is practically temperature independent since the voltage dividing portion of the network, which uses the portion 20 of the resistive strip 16, is of the same material and has the same temperature coefficient as the resistive elements 18 and 22 and for all practical purposes the same as the resistive elements 24 and 26. Since all four bridge resistive elements are in close proximity to the voltage dividing resistance 20, they will all change temperature at substantially the same instant, and therefore, will provide inherent temperature compensation.

As will be realized by those skilled in the art and as may be further noted in a patent to W. V. Wright, Jr., 3,049,658, issued August 14, 1962, the PN junction formed between the N type resistive elements and the P type silicon of the diaphragm 14 provides a great resistance to the passage of electricity, and that therefore, each of the resistive elements is electrically isolated from the others before the conductor strips are deposited thereon.

To provide additional isolation between the respective resistive elements, it may be a desirable precaution in some applications to evaporate a silicon monoxide layer over the entire diaphragm so that the electrical resistance between any two points on the diaphragm is great enough to avoid affecting the accuracy of the bridge circuit. In one embodiment of this invention, this electrical resistance was required to be more than one meg ohm. Since the silicon monoxide layer is applied after the sensor is otherwise completed, it is necessary that the sensor be extremely clean at the time of applying this layer so that conductive contaminants on the surface of the diaphragm 14 do not nullify this additional precaution.

While it is possible that placing the described bridge circuit on a given diaphragm will make it less flexible or stiffer and therefore less sensitive, this effect will be so slight as to be negligible. Since this effect is so slight it can for all practical purposes be ignored and the device will still provide high accuracy measurements.

In one embodiment of the invention, the conductors which were deposited on the sensor 10 were applied so as to fall between $5 \times 10^{-5}$ to $5 \times 10^{-4}$ inches thick. The width of these conductors was approximately 0.04 inch.

From the statements in the above paragraph, it will be realized that the dimensions shown in FIGURE 2 are for illustrative purposes only and are drawn for clarity sake, and that they are not in proportion one to the other as an example of an actual unit.

A further feature of this invention resides in the fact that there are no error inducing stresses such as may be obtained from bonding the strain sensitive elements to a bending means or diaphragm or mounting them on the diaphragm in one manner or another. These prior art methods normally produce stresses to provide erorrs in the output over certain ranges of strain.

In the embodiment shown, the two strain elements 24 and 26 are in a tension mode at the same time that elements 18 and 22 are in a compression mode. Therefore, there is approximately four times the output obtained over an embodiment where only one strain gage element is used as is the case in some strain gage bridge circuits. Further, since strain gage elements of the semiconductor type are approximately ten times more responsive than prior art type strain gages, there is a much higher output in this unit than there is in the prior art. Also much higher accuracies are obtainable since the four active arm bridge does not include any nonlinearities.

Although the embodiment shown in FIGURE 1 and described above in this specification relates to a semiconductor type strain gage, this invention is not so limited. The invention is intended to include other types of strain gages such as units wherein the strain gage sensors are made of organic materials. The invention lies in the use of the bridge balancing means as an integral part of the sensor. A further feature of this invention is that the bridge balancing circuit resistance is of the same material as are the strain gage elements.

It is to be understood that the form of the invention herewith shown and described, is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the appended claims.

I claim:

1. Force responsive apparatus, comprising, in combination:

cup shaped means including ring shaped mounting means and diaphragm means;

strain sensitive resistive means diffused in a surface of said diaphragm means, a first pair of said strain sensitive resistive means being located at the outer edges of said diaphragm means, a second pair of said strain sensitive resistive means being centrally located on said diaphragm means, further strain sensitive resistive means being adapted for use as a voltage dividing means and being centrally located on said diaphragm means;

first connection means connected to said first and second pairs of said strain sensitive resistive means for forming Wheatstone type bridge means including input and output means, said first pair of resistive means operating in a strain mode which is opposite the mode of strain of said second pair of resistive means, said bridge means providing an output signal in response to forces applied to said diaphragm means;

and second connection means connecting said further resistive means to said input means and said output means of said Wheatstone type bridge means for minimizing an output signal obtained from said bridge means under given force conditions.

2. In temperature compensated pressure to electrical transducer apparatus comprising, in combination:

silicon diaphragm means having a first conductivity type;

mounting means attached to said diaphragm means for mounting said diaphragm means to flex with pressure variations;

a plurality of silicon means of a second conductivity type diffused into said diaphragm means in the form of a plurality of resistance means, said resistance means varying in resistance as a function of mechanical strain applied thereto, and the proximity of said plurality of resistance means rendering them all of substantially the same temperature;

conductive means connecting portions of said plurality of silicon resistance means to form a bridge circuit having input and output means and further connecting an additional portion of said silicon resistance means between said input means of said bridge circuit means in the form of a voltage dividing means, said bridge circuit means providing output signal variations as a function of pressure variations;

and tap means electrically connecting one of said output means to a point intermediate the ends of said voltage dividing means to balance the output of said bridge means under predetermined pressure conditions.

3. Pressure sensitive apparatus comprising in combination:

diaphragm type means adapted for flexing as a function of pressure applied thereto;

first and second pairs of strain sensitive resistive means diffused into said diaphragm type means, said diaphragm type means providing tension strain on said first pair of strain sensitive resistance means as said diaphragm type means is flexed while providing compression strain on said second pair of strain sensitive resistance means;

means connecting said first and second pairs of strain sensitive resistance means to form bridge circuit means, said bridge circuit means including input and output means, and said bridge circuit providing output signals indicative in amplitude of the amount of flexing of said diaphragm type means; and voltage divider means comprising the same material as are said strain sensitive means, said voltage divider means being connected to said bridge circuit means for providing initial bridge balance under predetermined pressure conditions, said voltage divider means being diffused into said diaphragm type mounting means in close proximity to said bridge circuit thereby providing temperature compensation over a wide temperature range.

References Cited by the Examiner
UNITED STATES PATENTS

| | | | |
|---|---|---|---|
| 2,400,467 | 5/1946 | Ruge | 73—398 X |
| 2,815,480 | 12/1957 | Ruge | 73—88.5 X |
| 2,916,701 | 12/1959 | Gustafsson et al. | 73—88.5 X |
| 3,049,685 | 8/1962 | Wright | 73—88.5 |

RICHARD C. QUEISSER, *Primary Examiner.*

DAVID SCHONBERG, *Examiner.*